(12) United States Patent
Chen

(10) Patent No.: US 11,654,446 B2
(45) Date of Patent: May 23, 2023

(54) DEVICE FOR ADJUSTING AIR PRESSURE OF SPRAY GUN AND METHOD FOR THE SAME

(71) Applicant: HUI BAO ENTERPRISE CO., LTD., Changhua County (TW)

(72) Inventor: Wan Pao Chen, Changhua County (TW)

(73) Assignee: Hui Bao Enterprise Co., Ltd., Changhua County (TW)

( * ) Notice: Subject to any disclaimer, the term of this patent is extended or adjusted under 35 U.S.C. 154(b) by 125 days.

(21) Appl. No.: 16/994,981

(22) Filed: Aug. 17, 2020

(65) Prior Publication Data

US 2022/0016652 A1   Jan. 20, 2022

(30) Foreign Application Priority Data

Jul. 16, 2020   (TW) .................................. 109124085

(51) Int. Cl.
| | | |
|---|---|---|
| *B05B 7/12* | (2006.01) | |
| *B05B 12/00* | (2018.01) | |
| *B05B 7/24* | (2006.01) | |

(52) U.S. Cl.
CPC .............. *B05B 7/12* (2013.01); *B05B 12/002* (2013.01); *B05B 7/2478* (2013.01)

(58) Field of Classification Search
CPC ... Y10T 137/7808; B05B 7/12; B05B 7/1209; B05B 7/1218; B05B 7/1236; B05B 12/002
USPC ................................ 239/526–528, 570, 571
See application file for complete search history.

(56) References Cited

U.S. PATENT DOCUMENTS

| | | | |
|---|---|---|---|
| 6,626,382 B1 * | 9/2003 | Liu ........................... | B05B 7/12 239/296 |
| 2005/0252993 A1 * | 11/2005 | Rogers .................. | B05B 12/008 239/525 |
| 2006/0137745 A1 * | 6/2006 | Carnall ................. | F16K 17/046 137/505.25 |
| 2010/0101665 A1 * | 4/2010 | Larsen ................. | G05D 16/106 137/488 |

* cited by examiner

*Primary Examiner* — Jason J Boeckmann
(74) *Attorney, Agent, or Firm* — Rosenberg, Klein & Lee

(57) ABSTRACT

A device for adjusting air pressure of a spray gun, and a method for adjusting air pressure of a spray gun includes installing an air adjustment valve in a first chamber located at the rear end of a rear path of the spray gun. The spray gun is connected with a compressor and the users operates the air adjustment valve to reduce the pressure in the first chamber, and the second chamber is supplied with a pre-set pressure so as to stably provide constant pressure to the front path to proceed paint spraying task.

5 Claims, 11 Drawing Sheets

DEVICE FOR ADJUSTING AIR PRESSURE OF SPRAY GUN AND METHOD FOR THE SAME

BACKGROUND OF THE INVENTION

1. Fields of the Invention

The present invention relates to a spray gun, and more particularly, to a device for adjusting air pressure of a spray gun, and a method for adjusting air pressure of a spray gun.

2. Descriptions of Related Art

The conventional device for adjusting air pressure of a spray gun is disclosed in FIGS. 10 and 11, wherein the device includes a split unit 4 which splits the air introduced into the spray gun from a compressor. The split unit 4 splits the air into a first air flow 41 and a second air flow 2, wherein the first air flow 41 ejects from the nozzle 411, and the second air flow 42 ejects from the orifices 51 of the spray head 5.

The first air flow 41 ejects from the nozzle 411 and forms a negative pressure area in the front of the nozzle 411 so as to suck the paint in the paint cup 7 to spray onto an object along with the first air flow 41. The second air flow 42 respectively ejects from the spray head 5 to restrict the ejected paint so that the paint is sprayed to the object by a fan-shaped form.

The users often adjust the air pressure from the compressor by the air adjustment valve 6 due to the air pressure from the compressor is about 6 to 8 bars which are too high for most of the spray guns and could affect the quality of painting result. Therefore, an exterior pressure adjustment valve 8 with an air pressure meter 81 are used to adjust the air pressure before being introduced into the spray gun. The users then pulls the trigger 9 to use the proper air pressure around 0.5 to 2.4 bars to spray paint to an object. This conventional way obviously is not efficient.

The present invention intends to provide a device for adjusting air pressure of a spray gun, and a method for adjusting air pressure of a spray gun.

SUMMARY OF THE INVENTION

The present invention relates to a method for adjusting air pressure of a spray gun, and comprises the following steps:

a step of establishing chambers: establishing a first chamber and a second chamber at the rear end of a trigger valve, and above a main path in a grip of the spray gun, the first chamber communicating with the second chamber;

a step of establishing an air adjustment valve: installing a movable part and a spring to the first end of a tube, and installing an adjustment member to the second end of the tube to form the air adjustment valve, the tube having a radial hole defined radially through the tube;

a step of installing the air adjustment valve: installing the air adjustment valve in the first chamber, aligning the radial hole of the tube with an opening of the main path in the grip, and a step of establishing marks on the adjustment member: respectively forming a threaded section and a knob to two ends of the adjustment member, forming a groove to the outer periphery of the adjustment member and located between the two ends of the adjustment member, forming the marks to the knob, the marks being made corresponding spring constant "k" of the spring.

The second chamber includes a pre-set pressure (P). A spring force P1=P×A. "A" represents an area of the movable part that the spring applies a force to. "P1" represents a force from the spring, and d represents displacement of the spring. P1=kd. P2 represents pressure from a compressor. P3 represents the pressure that the spray gun 1 spray paint. P3<P<P2. When the movable part moves, the passage of the movable part is sealed by a plastic pad on the adjustment member to cut communication between the first and second chambers so that the second chamber includes a stable pressure.

The present invention does not need any exterior air pressure meter to adjust the required pressure. The users simply operate the knob of the adjustment member to get the desired air pressure to have a pre-set pressure in the second chamber. The air pressure in the grip is maintained in a pre-set range so as to provide stable air pressure to the front path to proceed spraying task.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 9-1 shows the relationship between the air pressure adjusted by the air adjustment valve of the conventional spray gun and the air pressure that the conventional spray gun sprays paint;

DETAILED DESCRIPTION OF THE PREFERRED EMBODIMENT

Figure 1:
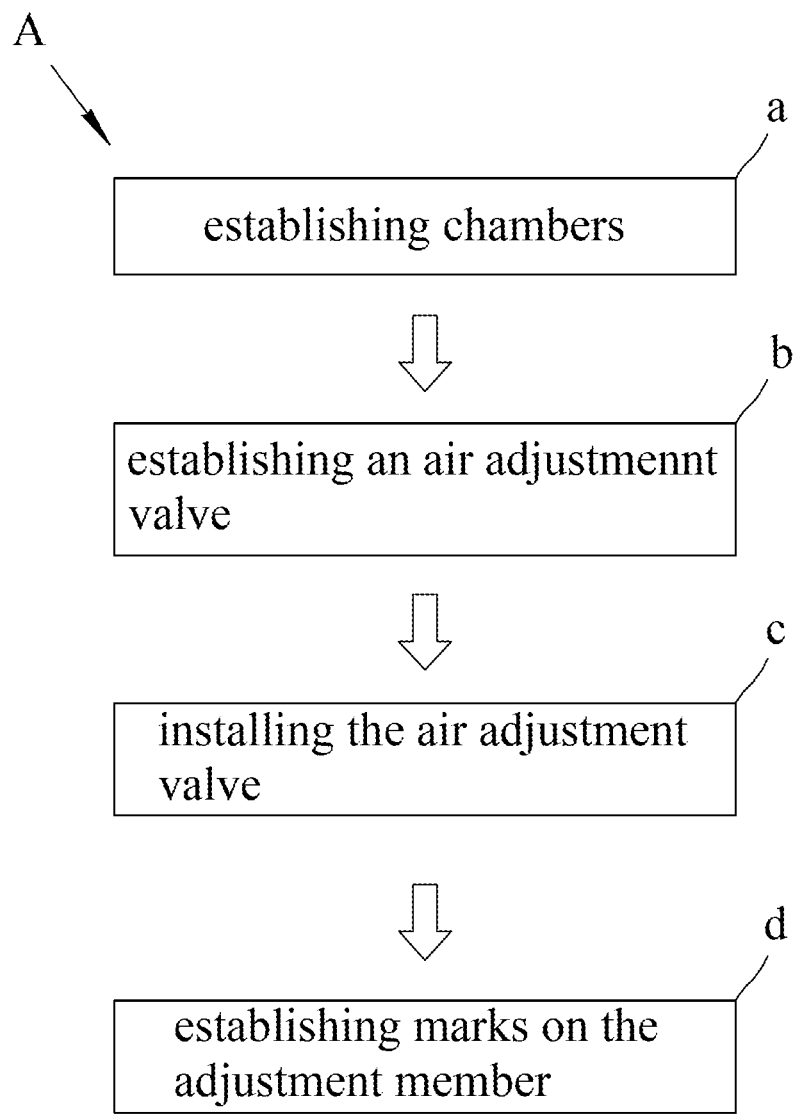
FIG. 1 shows the steps of the method of the present invention.
Figure 2:
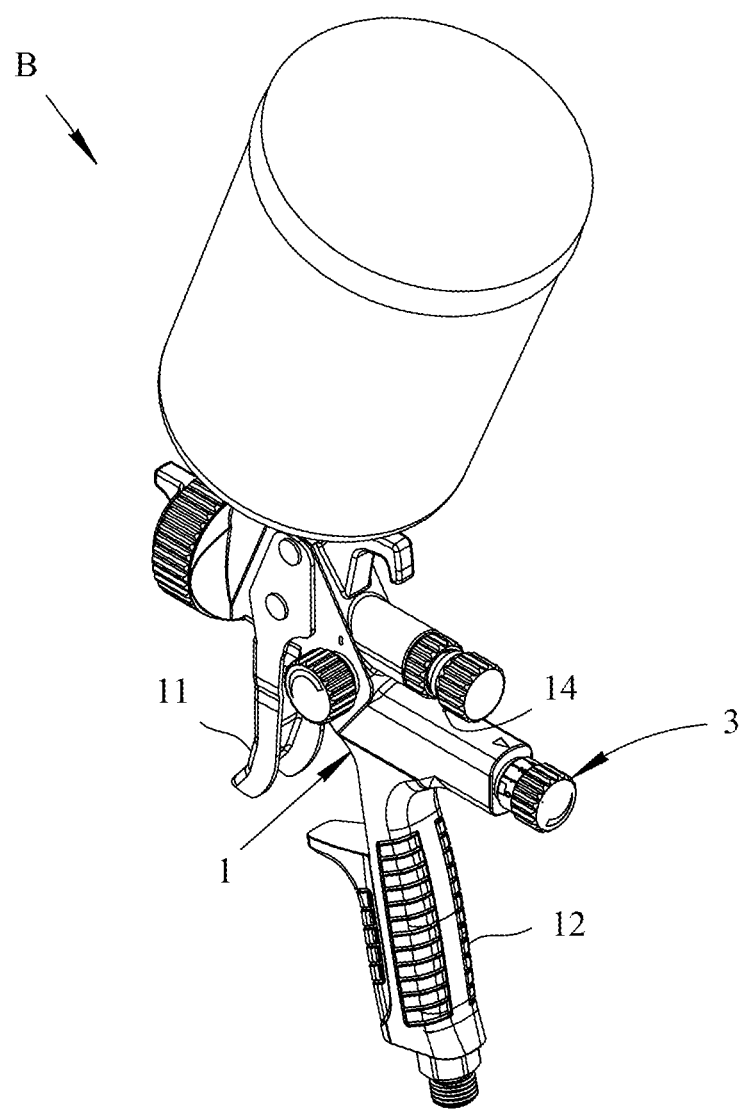
FIG. 2 is a perspective view to show the spray gun of the present invention.
Figure 3:
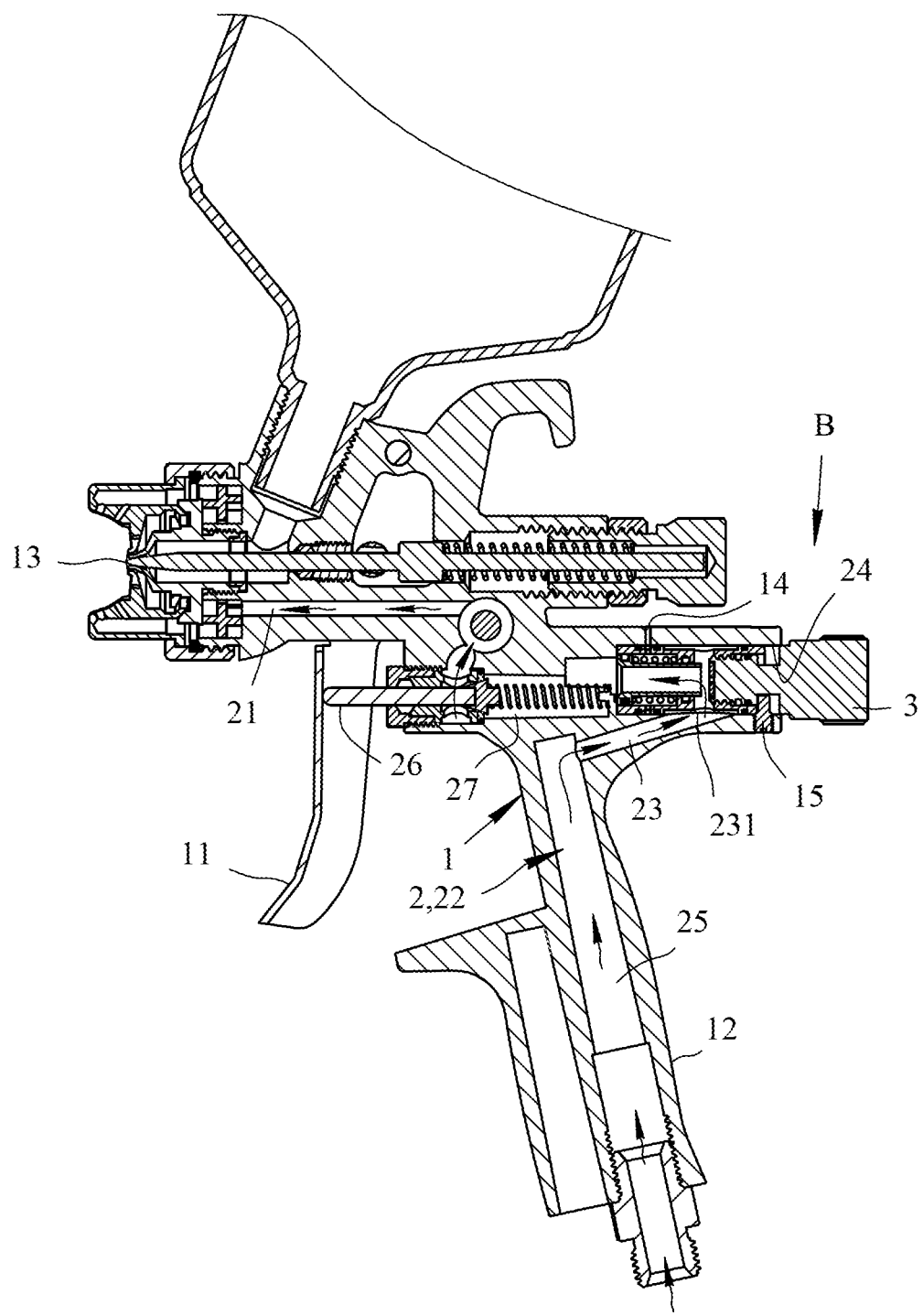
FIG. 3 is a cross sectional view to show the spray gun of the present invention.
Figure 4:
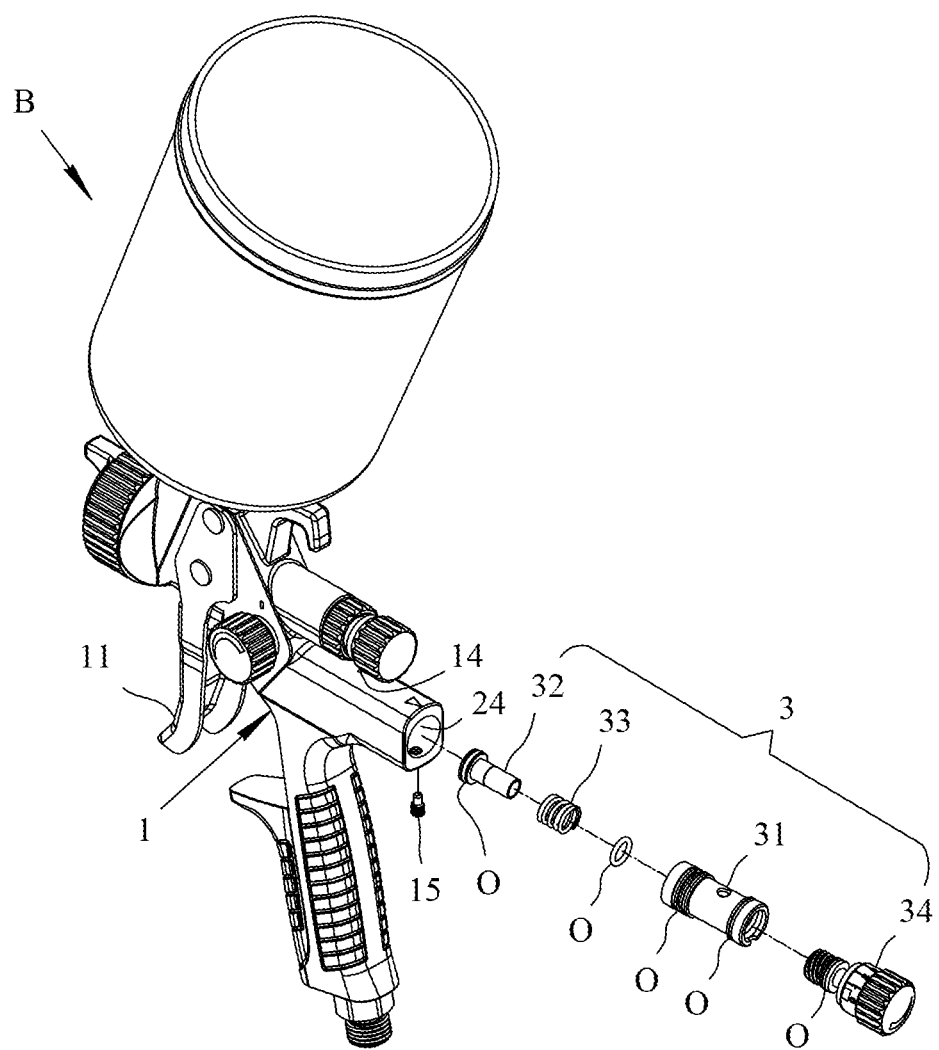
FIG. 4 is an exploded view of the air adjustment valve of the spray gun of the present invention.
Figure 5:
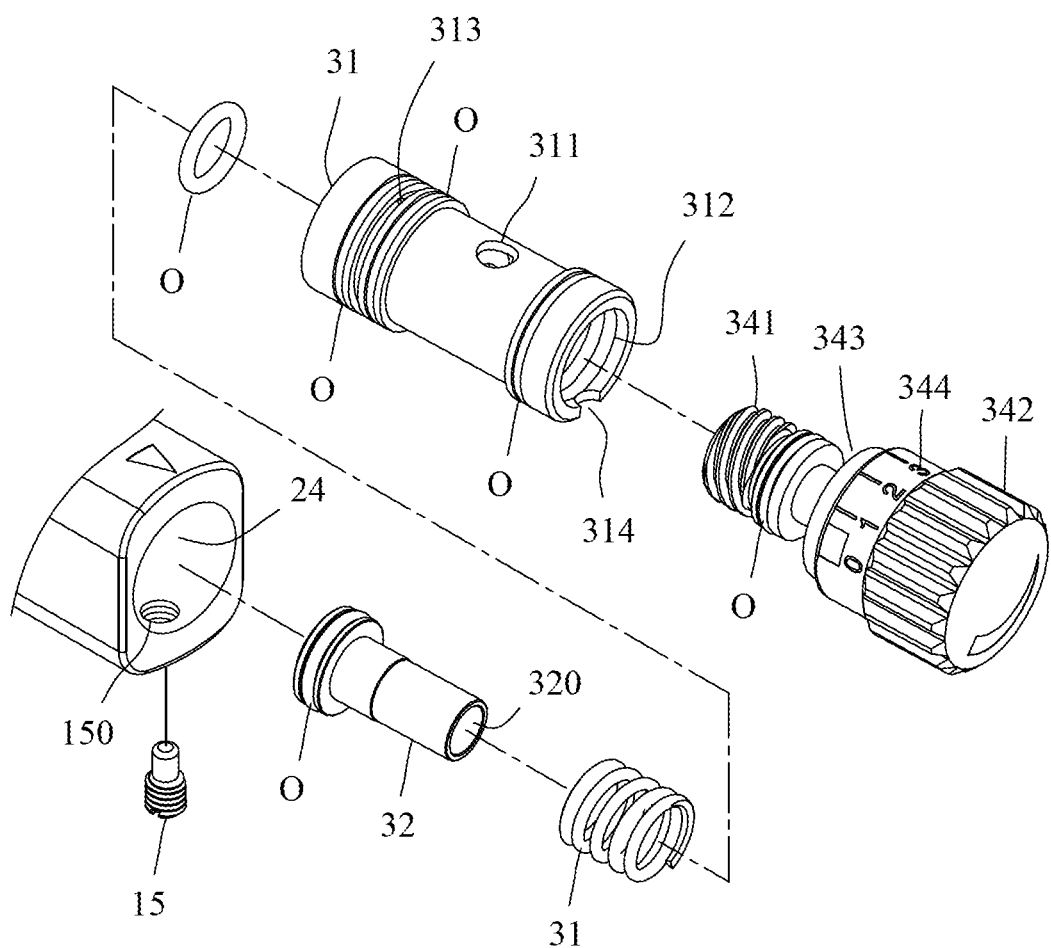
FIG. 5 is an enlarged and exploded view of the air adjustment valve of the spray gun of the present invention.
Figure 6:
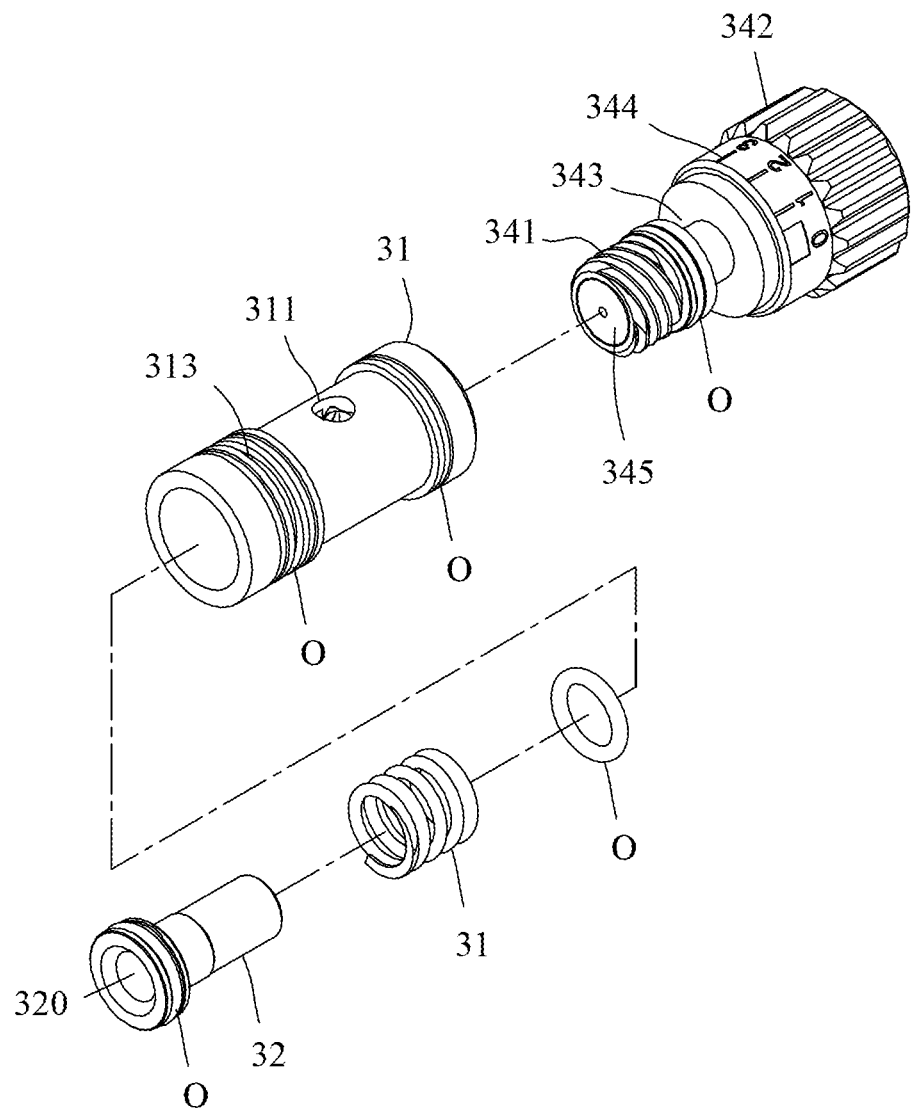
FIG. 6 is another exploded view of the air adjustment valve of the spray gun of the present invention.
Figure 7:
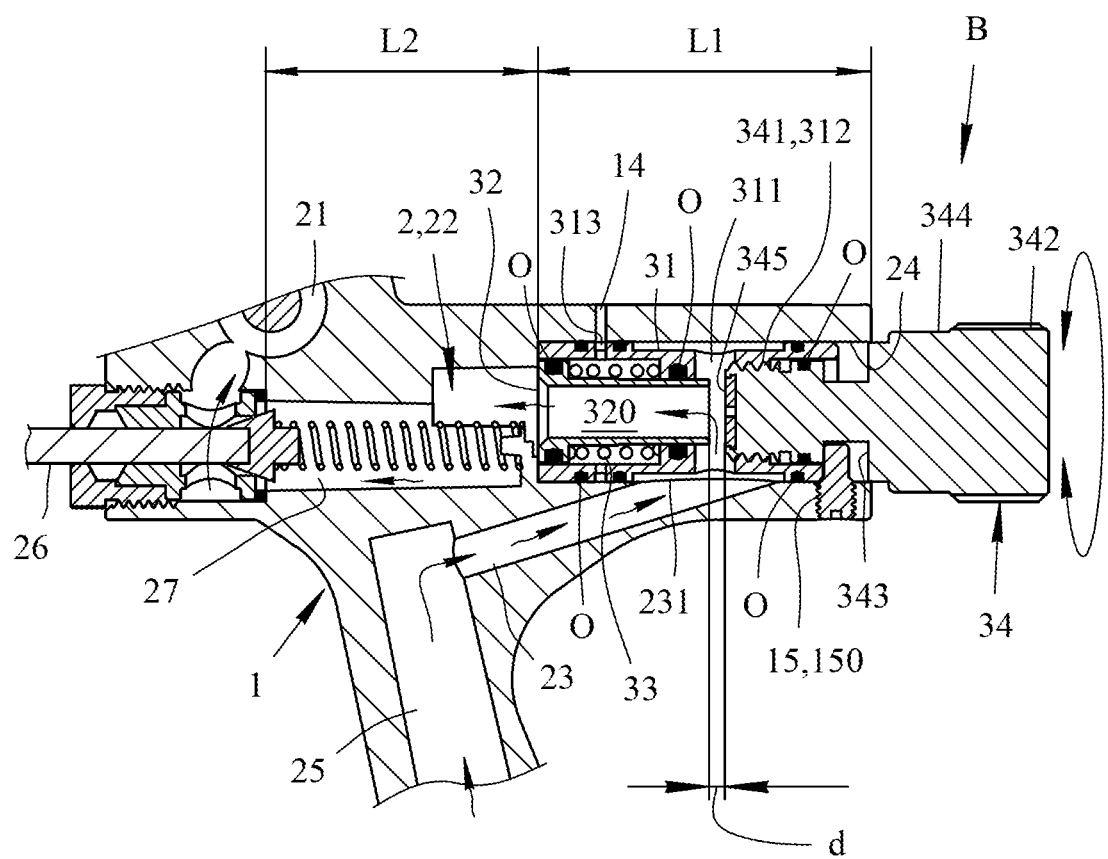
FIG. 7 is a cross sectional view of a portion of the spray gun of the present invention.

Referring to FIGS. 1, 4 and 7, the method for adjusting air pressure of a spray gun of the present invention comprises the following steps:

a step (a) of establishing chambers: establishing a first chamber 24 (L1) and a second chamber 27 (L2) at a rear end of a trigger valve 26 and above a main path 2 in a grip 12 of the spray gun 1, the first chamber 24 communicating with the second chamber 27;

a step (b) of establishing an air adjustment valve 3: installing a movable part 32 and a spring 33 to a first end of a tube 31, and installing an adjustment member 34 to a second end of the tube 31 to form the air adjustment valve 3, the tube 31 having a radial hole 311 defined radially through the tube 31;

a step (c) of installing the air adjustment valve 3: installing the air adjustment valve 3 in the first chamber 24, aligning the radial hole 311 of the tube 31 with an opening 231 of the main path 2 in the grip 12, and a step (d) of establishing marks 344 on the adjustment member 34: respectively forming a threaded section 341 and a knob 342 to two ends of the adjustment member 34, forming a groove 343 to an outer periphery of the adjustment member 34 and located between the two ends of the adjustment member 34, forming the marks 344 to the knob 342, the marks 344 being made corresponding spring constant "k" of the spring 33.

Preferably, a screw 15 is threadedly inserted into the spray gun 1 and inserted in the groove 343 of the adjustment member 34 in the step (c) of installing the air adjustment valve 3.

The device for adjusting air pressure of a spray gun of the present invention as disclosed in FIGS. 2-7, and comprises a spray gun 1 having a rigger 11 and a grip 12. A main path 2 is formed in the spray gun 1, and a grip path 25 is formed in the grip 12. A sub path 23 communicates with the grip path 25. A trigger valve 26 is connected to the spray gun 1 and the output shaft of the trigger valve 26 contacts the trigger 11. The trigger valve 26 divides the main path 2 into a front path 21 and a rear path 22. The front path 21 communicates with a nozzle 13 at the front end of the spray gun 1. The rear path 22 is located at the rear end of the trigger valve 26 and communicates the sub path 23 and the grip pat 25. A first chamber 24 and a second chamber 27 are respectively formed in the rear path 22.

An air adjustment valve 3 is located in the first and second chambers 24, 27. The first chamber 24 is located at the rear end of the trigger valve 26 and above an opening 231 of the sub path 23. The sub path 23 communicates with the first chamber 24 via the opening 231 as shown in FIG. 7. The second chamber 27 is supplied with a pre-set pressure from a compressor (not shown) connected to the grip 12 so as to provide air pressure to the front path 21 by operating the air adjustment valve 3.

The air adjustment valve 3 includes a tube 31. A movable part 32 and a spring 33 are connected to the first end of the tube 31, and an adjustment member 34 is connected to the second end of the air adjustment valve 3. The tube 31 includes a radial hole 311 defined radially therethrough. The radial hole 311 of the tube 31 is aligned with the opening 231 of the sub path 23. Multiple seal rings "O" are mounted to the tube 31. The radial hole 311 is located between the seal rings "O". A first orifice 313 is formed through the tube 31, and the spray gun 1 includes a second orifice 14 which is located corresponding to the first orifice 313.

The adjustment member 34 includes a threaded section 341 and a knob 342 respectively formed to two ends thereof. The threaded section 341 is threadedly connected to inner threads 312 of the tube 31. Another seal ring "O" is mounted to the threaded section 341. A plastic pad 345 is attached to the distal end of the threaded section 341.

A groove 343 is formed to the outer periphery of the adjustment member 34 and located between the threaded section 341 and the knob 342. The knob 342 includes marks 344 formed thereto. The marks 344 includes 0, 1, 2 and 3 four marks. These digit marks respectively represent the inner air pressure of the first chamber 24 and the second chamber 27 to be 0 bar, 1 bar, 2 bars and 3 bars. It is noted that the tube 31 includes a notch 314 formed to the second end of the tube 31. A screw 15 is threadedly inserted into the spray gun 1 via a threaded hole 150 of the spray gun 1 as shown in FIG. 4, and the screw 15 is inserted in the groove 343 of the adjustment member 34 via the notch 314 to restrict the tube 31 from rotating.

When in use, as shown in FIG. 7, when the output pressure P3 is set as shown in FIGS. 3 to 7, the grip 12 is connected with an air pressure source such as a compressor (not shown), and the compressor provides an air pressure P2 to the spray gun 1. The air enters into the grip path 25, the sub path 23, the first chamber 24, the passage 320 of the movable part 32 and then into the second chamber 27. The trigger valve 26 seals the outlet of the second chamber 27 as shown in FIG. 7. Therefore, the second chamber has a pre-set pressure P, wherein P3<P<P2. The spring force is $P1 = P \times A$, wherein "A" represents an area of the movable part 32 that the spring 23 applies a force to. "P1" represents a force from the spring 33, and "d" represents displacement of the spring 23. $P1 = kd$ wherein "k" represents the spring constant.

When pulling the trigger 11, the front path 21 communicates with the second chamber 27. When P×A is less than P1, the movable part 32 moves left to communicate the first chamber 24 and the rear path 22, so that the air pressure in the rear path 22, the first chamber 24 and the second chamber 27 is provided to the front path 21 to start spraying action.

Figure 8:
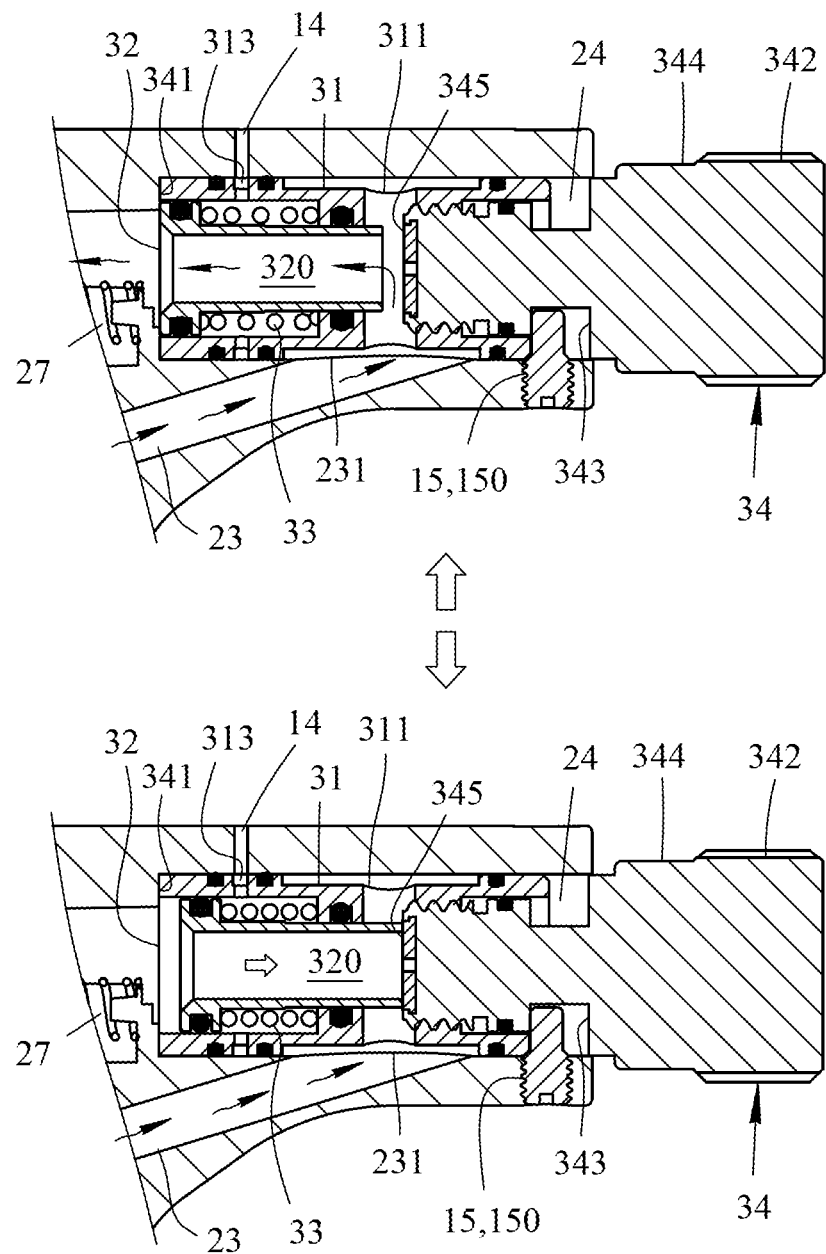
FIG. 8 shows the statuses that the knob of the adjustment member is rotated.

As shown in FIGS. 7 and 8, because the spring 33 pushes the movable part 32 toward the second chamber 27 to maintain communication between the sub path 23 and the first chamber 24 so that the air pressure will be provided to the front path 21. When the user releases the trigger 11, the trigger 26 cuts off the communication between the front path 21 and the rear path 22 to stop spraying. The second chamber 27 will accumulates the pre-set pressure P, and the movable part 32 moves right to contact the plastic pad 345 of the adjustment member 34 to cut off the communication between the sub path 23 and the second chamber 27. Therefore, no air pressure is supplied to the spray gun 1.

When adjusting the pre-set pressure P by operating the adjustment member 34, the knob 342 is rotated by the guide of the marks 344 to control the displacement "d" of the spring 33 to adjust the air pressure in the first chamber 24 and the second chamber 27. That is to say, when the adjustment member 34 is rotated into the tube 31, the air pressure of the second chamber 27 pushes the movable part 32 so that the displacement "d" toward right is short, and the opening 231 of the sub path 23 is quickly sealed. The air pressure in the second chamber 27 is the pre-set pressure P.

When the adjustment member 34 is rotated in the opposite direction (away from the tube 31), the displacement "d" toward right is longer, and it takes a longer period of time to seal the opening 231 of the sub path 23. In other words, more air enters into the second chamber 27 so that the pre-set pressure P is larger than the previously adjustment. In order to move the movable part 32 smoothly, the first and second orifices 313, 14 communicate with outside of the spray gun 1.

As shown in FIG. 8, when pulling the trigger 11 to communicate the front and rear paths 21, 22, the air pressure is supplied to the front path 21 via the rear path 22 to spray. The air pressure in the second chamber 27 is reduced, and the movable part 32 moves left, and the opening 231 of the sub path 23 is opened to introduce air therethrough. When the trigger 11 is released, the air pressure in the second chamber 27 is increased, and the movable part 32 moves right to seal the opening 231 of the sub path 23. Therefore, the air pressure in the rear path 22 is maintained within a desired range so as to constantly and stably provide pressure to the front path 21 to proceed spraying task.

Figure 9:
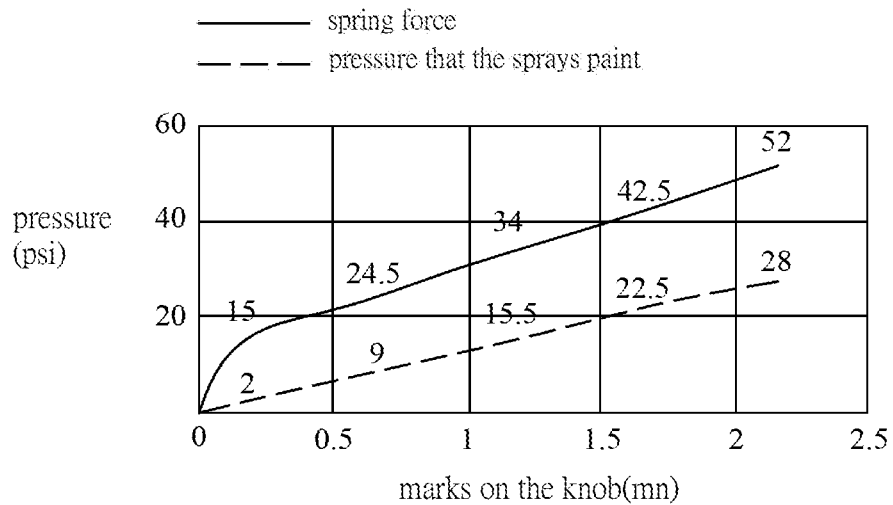
FIG. 9 shows the relationship between the spring force and the air pressure that the spray gun of the present invention sprays paint.
Figures 1, 9:
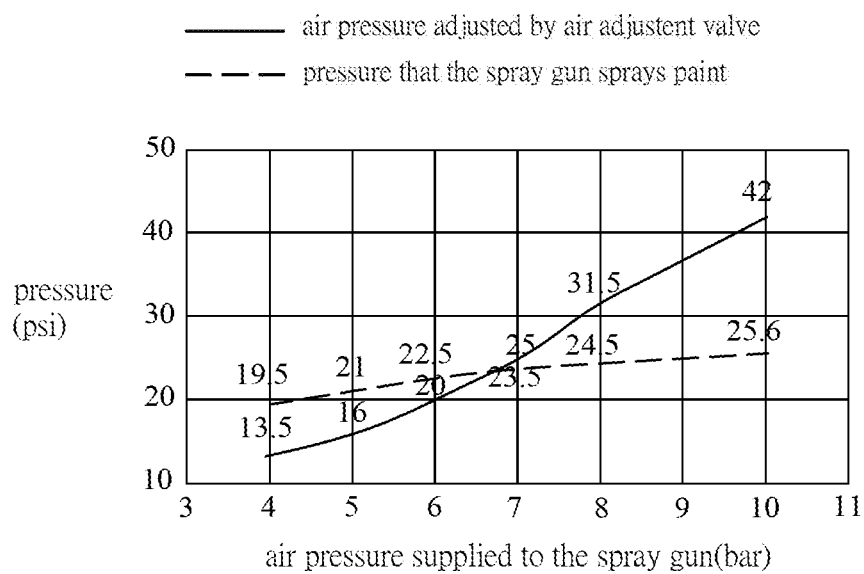
Figure 10:
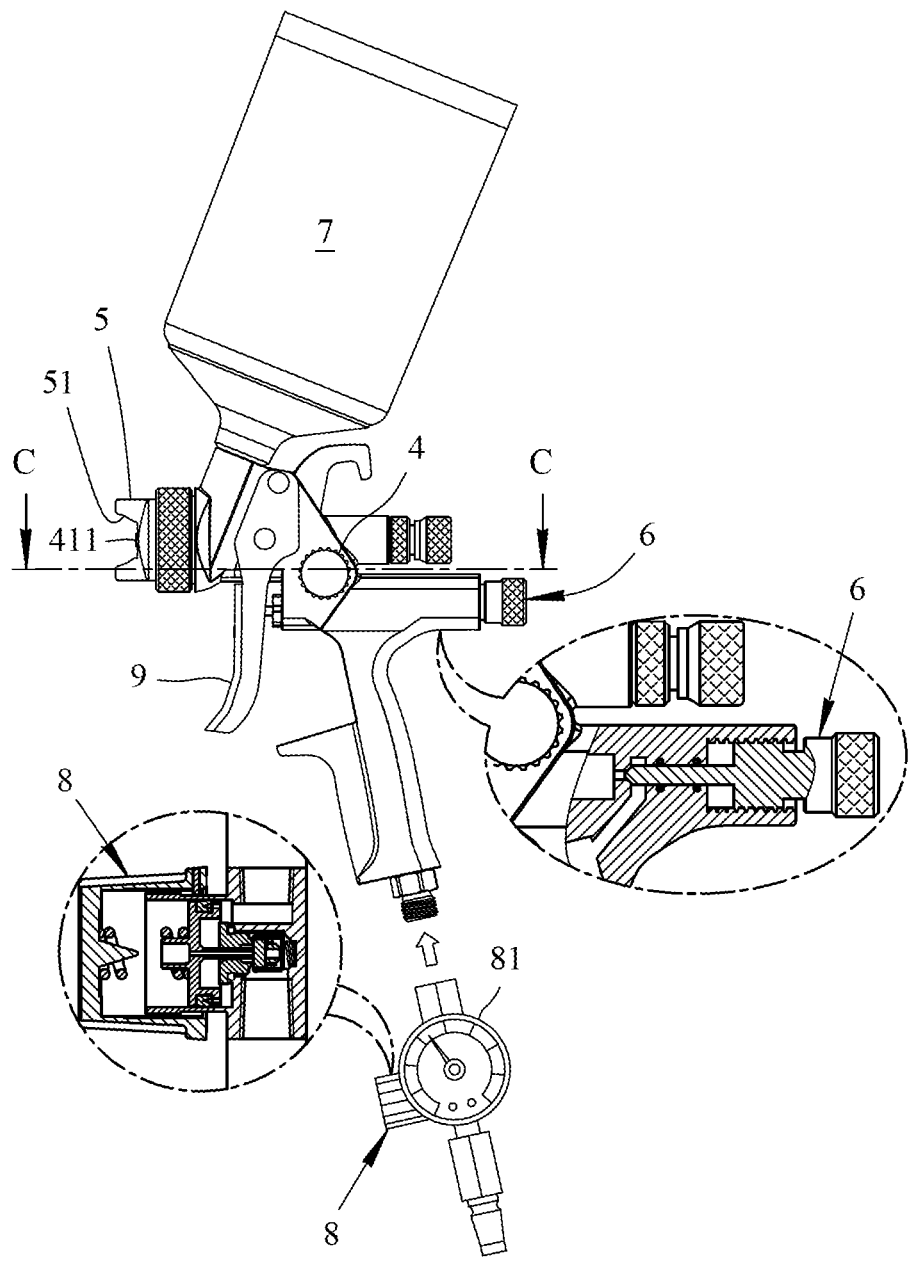
FIG. 10 illustrates the conventional spray gun cooperated with an exterior pressure adjustment valve.
Figure 11:
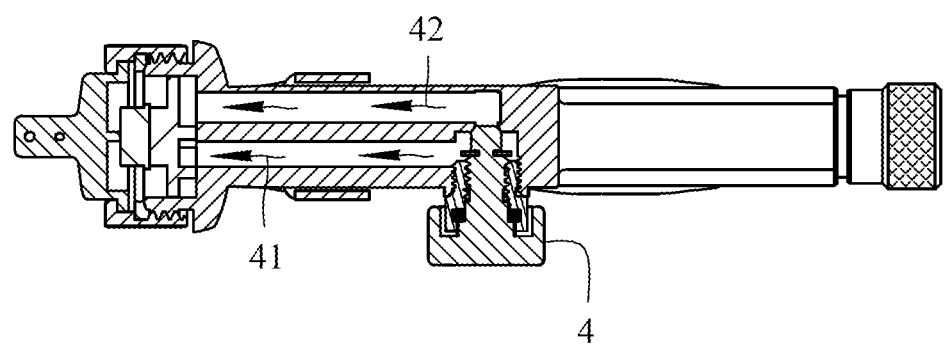
FIG. 11 is a cross sectional view, taken along line C-C in FIG. 10.

As shown in FIG. 9 which shows that the force that the spring 33 generates is proportional to the air pressure that the spray gun 1 sprays paint. On the contrary, as shown in FIG. 9-1, there is a significant difference between the air pressure that supplied to the conventional spray gun and the air pressure that the conventional spray gun 1 sprays paint. In other words, the spray gun of the present invention can stably spray the paint, and the conventional spray gun cannot control the paining quality due to unstable pressure.

While we have shown and described the embodiment in accordance with the present invention, it should be clear to those skilled in the art that further embodiments may be made without departing from the scope of the present invention.

What is claimed is:

1. A spray gun having a device for adjusting air pressure, comprising:
    a spray gun body having a trigger and a grip, a main path formed in the spray gun body, a grip path formed in the grip, and a sub path in open communication with the grip path, the sub path having a first opening at a first end of the sub path in a direct communication with the grip path and a second opening at an opposite end of the sub path;
    a trigger valve connected to the spray gun body and contacting the trigger, the trigger valve dividing the main path into a front path and a rear path, the front path being in communication with a nozzle of the spray gun body, the rear path being located at a rear end of the trigger valve and being in communication with the sub path, a first chamber and a second chamber being respectively formed in the rear path in a spaced apart relationship with the grip path;
    an air adjustment valve located in the first and second chambers, the second chamber being located at the rear end of the trigger valve and the first chamber being located above and in communication with the second opening of the sub path, the air adjustment valve including a longitudinally extending tube configured with a radial hole defined radially therethrough in alignment with the second opening of the sub path, and a movable part and a spring being located at a first end of the tube adjacent to the second chamber, the movable part having an air passage extending longitudinally therethrough and being longitudinally slidably displaceable against a bias force of the spring by air pressure in the second chamber, the adjustment valve further including an adjustment member having a distal end connected to an opposing second end of the tube and being manually operable to adjust a longitudinal distance between the distal end of the adjustment member and a corresponding end to the movable part, an air flow path through the air passage of the movable part being closed responsive to the corresponding end thereof contacting the distal end of the adjusting member to limit the air pressure in the second chamber, and the movable part being reversibly displaced by the spring responsive to the air pressure in the second chamber being reduced and thereby regulate the air pressure supplied to the second chamber, wherein the manually adjusted longitudinal distance between the distal end of the adjustment member and the corresponding end of the movable part sets a selected regulated pressure of air supplied to the second chamber for supplying the selected predetermined regulated pressure to the front path.

2. The spray gun as claimed in claim 1, wherein multiple seal rings are mounted to the tube, the radial hole is located between the seal rings, a first orifice is formed through the tube, the spray gun body includes a second orifice which is located in correspondence with the first orifice.

3. The spray gun as claimed in claim 1, wherein the adjustment member includes a threaded section at the distal end thereof and a knob respectively formed at an opposing end thereof, the threaded section is threadedly connected to inner threads of the tube, a seal ring is mounted to the threaded section, a groove is formed to an outer periphery of the adjustment member and located between the threaded section and the knob, the knob includes marks formed thereto and representing different predetermined regulated pressure settings.

4. The spray gun as claimed in claim 3, wherein the tube includes a notch formed adjacent the second end of the tube, a screw threadedly passing between the spray gun body and the groove of the adjustment member via the notch restricts rotation the tube.

5. The spray gun as claimed in claim 1, wherein the adjustment member includes a plastic pad attached to the distal end thereof.

* * * * *